(12) United States Patent
Melo et al.

(10) Patent No.: US 11,643,199 B2
(45) Date of Patent: May 9, 2023

(54) VERTICAL TAKE-OFF AND LANDING (VTOL) AIRCRAFT

(71) Applicant: EVE UAM, LLC, Wilmington, DE (US)

(72) Inventors: Adilson Melo, São José dos Campos—SP (BR); Alberto Dei Castelli, São José dos Campos—SP (BR); Fabio Zaroni, São José dos Campos—SP (BR); Felipe Nahime Cursino, São José dos Campos—SP (BR); Fernando Rodrigues Vianna, São José dos Campos—SP (BR); Flavia Renata Dantas Alves Silva, São José dos Campos—SP (BR); Geraldo Carvalho, São José dos Campos—SP (BR); Igor Miranda Rodrigues, São José dos Campos—SP (BR); Julio Cesar Graves, São José dos Campos—SP (BR); Luiz Antonio Madeira, Jr., São José dos Campos—SP (BR); Luiz Felipe Ribeiro Valentini, São José dos Campos—SP (BR); Rafael Desideri de Freitas, São José dos Campos—SP (BR); Rafael Estefano Reis Cleto, São José dos Campos—SP (BR); Ricardo Takeshi Demizu, São José dos Campos—SP (BR); Rodrigo Takashi Lourenco Kawasaki, São José dos Campos—SP (BR); Thalerson Augusto Mortari Alves, São José dos Campos—SP (BR); Vinicius Magalhaes Cunha, São José dos Campos—SP (BR); Yasser Mahmud Abdallah, São José dos Campos—SP (BR)

(73) Assignee: EVE UAM, LLC, Wilmington, DE (US)

( * ) Notice: Subject to any disclaimer, the term of this patent is extended or adjusted under 35 U.S.C. 154(b) by 0 days.

(21) Appl. No.: 16/867,895

(22) Filed: May 6, 2020

(65) Prior Publication Data
US 2020/0354048 A1 Nov. 12, 2020

Related U.S. Application Data

(60) Provisional application No. 62/846,426, filed on May 10, 2019.

(51) Int. Cl.
*B64C 29/00* (2006.01)
*B64C 27/26* (2006.01)
(Continued)

(52) U.S. Cl.
CPC ............ *B64C 29/0025* (2013.01); *B64C 3/16* (2013.01); *B64C 25/52* (2013.01); *B64C 27/26* (2013.01)

(58) Field of Classification Search
CPC ....... B64C 29/0025; B64C 3/16; B64C 25/52; B64C 27/26
See application file for complete search history.

(56) References Cited

U.S. PATENT DOCUMENTS 3,089,666 A * 5/1963 Quenzler ............ B64C 29/0033
244/66
6,293,491 B1 * 9/2001 Wobben ................. B64D 27/24
244/17.23
(Continued)

FOREIGN PATENT DOCUMENTS

WO WO 2015/028627 3/2015

OTHER PUBLICATIONS

EP Search Report and Opinion, EP Appln. 20173491.0, dated Oct. 7, 2020.

*Primary Examiner* — Brian M O'Hara
(74) *Attorney, Agent, or Firm* — Nixon & Vanderhye P.C.

(57) ABSTRACT

Vertical takeoff and landing (VTOL) aircraft, especially electric VTOL (e-VTOL) aircraft include a fuselage (which may include a pair of ground-engaging skids) defining a longitudinal axis of the aircraft, forward and aft pairs of port and starboard aerodynamic wings extending laterally outwardly from the fuselage and forward and aft pairs of port and starboard rotor pods each being in substantial alignment with the longitudinal axis of the fuselage. In specific
(Continued)

embodiments, each of the forward and aft pairs of port and starboard rotor pods comprises a forward and aft pair of rotor assemblies.

5 Claims, 7 Drawing Sheets

(51) Int. Cl.
   *B64C 3/16* (2006.01)
   *B64C 25/52* (2006.01)

(56) References Cited

U.S. PATENT DOCUMENTS

| | | | |
|---|---|---|---|
| 8,485,464 B2* | 7/2013 | Kroo | B64C 29/0025 244/6 |
| 10,131,426 B2* | 11/2018 | Judas | B64C 39/08 |
| 10,518,875 B2* | 12/2019 | Judas | B64C 29/0033 |
| 10,577,091 B2* | 3/2020 | Parks | B64D 27/24 |
| 10,787,255 B2* | 9/2020 | George | B64D 9/00 |
| 11,066,161 B2* | 7/2021 | Mermoz | B64C 29/0033 |
| 2015/0314867 A1 | 11/2015 | Razroev | |
| 2018/0105267 A1 | 4/2018 | Tighe et al. | |
| 2019/0127056 A1 | 5/2019 | Weekes et al. | |
| 2019/0337613 A1* | 11/2019 | Villa | B64C 27/10 |

* cited by examiner

VERTICAL TAKE-OFF AND LANDING (VTOL) AIRCRAFT

CROSS-REFERENCE TO RELATED APPLICATION

This application is based on and claims domestic priority benefits from U.S. Provisional Application Ser. No. 62/846,426 filed on May 10, 2019 and is related to U.S. Design patent application Ser. No. 29/690,848 filed on May 10, 2019 (now U.S. Pat. No. D914,171), the entire contents of which are expressly incorporated hereinto by reference.

FIELD

The embodiments disclosed herein relate generally to vertical take-off and landing (VTOL) aircraft. According to certain embodiments disclosed herein, electric VTOL (e-VTOL) aircraft are provided.

BACKGROUND

Wingborn flight is a challenge and its achievement has been inhibited by the lack of power-to-weight ratios associated with internal combustion engines available in the first decades of the 20th century. Vertical flight poses an even greater challenge and the need for extreme overall system efficiencies in order to sustain a thrust-born flight, takeoff and landing.

The classical solution which is currently accepted by those in this art is the traditional helicopter which typically includes one large main rotor for lift generation and a smaller rotor to counteract main rotor torque to achieve stabilization. Other stable configurations include two main rotors rotating in opposite directions, although the use of such multiple main rotors is less common and limited to specific missions and scenarios (e.g., the Chinook helicopter in the inventory of the US Army).

Currently, helicopters (and other VTOL aircraft) are usually powered by one or more internal combustion engines (either reciprocating or turbo-shaft), that produce powered transmitted to the rotors through gearboxes. With the advent of new and improved electrical powertrains, it is increasingly becoming possible to use a so-called "distributed propulsion" concept, which imposes advantages for multi-copters in particular scenarios.

Trimmed flight is required for any aircraft. An aircraft is said to be trimmed when it achieves equilibrium (i.e., sum of forces and moments are equal to zero) without pilot input. Currently, fly-by-wire (FBW) systems can provide auto-trim functionality. In order to meet operational and certification requirements, an aircraft must be capable of being trimmed and controlled even in an aerodynamic destabilizing effect associated with an engine/motor failure event.

For the specific case of multi-copters, the operational and certification requirements imply that after the loss of one engine/motor/rotor, the sum of moments and forces will continue to add up to zero, so the static equilibrium is obtained. Unfortunately, sum of moments and forces is only part of the problem since controllability and stability are also relevant in such a scenario. Maintaining both controllability and stability throughout the entire flight, even during and after an engine/motor/rotor failure, is also a challenge.

Each rotor of a multi-copter not only provides providing lift but also provides control. As such, it is possible to have more control actuators (rotors) than states to be controlled (degrees of freedom). A technical solution to the problem therefore relies on the design and placement of the rotors in such a way that the overall rotor configuration is able to meet the control and stability requirements of an inoperative engine/motor/rotor event. The combination of the number of rotors and the positional placement of the rotors provides for multiple possible solutions. For example, hexa-copters may be provided with different rotor displacement to in turn provide different degrees of controllability, stability, and performance characteristics during both normal operation or even during a rotor failure.

Other multi-copter characteristics are sensible to rotor displacement. For instance, during forward flight, a tandem configuration (displaced rotors that are aligned alongside a fuselage centerline) is susceptible to interference between rotors, reducing vehicle performance. Rotor interference increases noise level and battery consumption.

Electrical vehicles for urban air mobility are subject to several restrictions such as:
- The capability to use available heliport infrastructure (with some adaptation);
- Lower noise level when comparing to existing vehicles (to provide scalability and social acceptance);
- Adequate mission profile (an overestimated mission profile could increase operational cost due to fix battery weight for all missions);
- Safety (to provide scalability and social acceptance).

Actual infrastructure imposes superior dimensional boundaries (footprint). On the other hand, noise literature indicates that disk-loading reduction is effective to reduce noise intensity. This reduction is possible by reducing vehicle weight or increasing rotor diameter. Weight is function of mission profile, payload, cabin dimension, vehicle sweat area, vehicle efficiency, crashworthiness requirements, flight loads, systems availability, and others. Limitations on rotor diameter are related to dynamic response and vehicle footprint.

Safety and electrical requirements enable distributive propulsion architecture. Some multiple rotor configuration tolerates rotor loss and system failures. However, there is an additional penalty due to rotor interference, reducing overall vehicle efficiency.

A lift plus cruise e-VTOL configuration comprises two different flight phases, namely wing-born flight and thrust-born flight, each one with their own specific technical requirements. To avoid using tilting rotors or tilting wing mechanisms, and considering hover rotors forward flight characteristics (retreating blade stall), one must consider minimizing transition speed from wing- to thrust-born phases. Therefore, it is necessary to increase wing area.

The amount of variables considered in an e-VTOL project increases its complexity. Evidence of such complexity is the variety of vehicle architectures available in the general media, i.e., there is no consensus regarding the best vehicle topology. In addition, different vehicle topology optimizes different project criteria. For example, energetic optimization leads to a different vehicle topology when compared to user experience, operational cost, maneuverability, or even vehicle price optimization. Each business model requires a different vehicle topology.

It would therefore be desirable if an aircraft could be provided having VTOL capability, especially eVTOL capability, which provide for a vehicle topology considered to be a good trade-off between the vehicle objectives for the next prototype and which solves the technical problems noted hereinabove. It is towards providing such a solution that the embodiments disclosed herein are directed.

SUMMARY

The embodiments disclosed herein generally relate to VTOL aircraft, especially e-VTOL aircraft provided with a fuselage (which may include a pair of ground-engaging skids) defining a longitudinal axis of the aircraft, forward and aft pairs of port and starboard canards and aerodynamic wings extending laterally outwardly from the fuselage and forward and aft pairs of port and starboard rotor pods each being in substantial alignment with the longitudinal axis of the fuselage. In specific embodiments, each of the forward and aft pairs of port and starboard rotor pods comprises a forward and aft pair of rotor assemblies.

The forward pairs of port and starboard rotor pods are positioned forwardly of a center of gravity (CG) of the aircraft, while the aft pairs of the port and starboard rotor pods may be positioned aft of the aircraft CG.

In order to improve stability, one-half of the rotor assemblies in the VTOL aircraft described herein may be caused to rotate in one direction while a remaining one-half of the rotor assemblies rotate in a counter direction relative thereto.

According to some embodiments, each of the forward and aft pairs of port and starboard canards and aerodynamic wings may be positioned in a respective substantially horizontal plane, and wherein the substantially horizontal plane of the aft pair of port and starboard aerodynamic wings is displaced upwardly relative to the substantially horizontal plane of the forward pair of port and starboard canards. The aft pairs of port and starboard aerodynamic wings may, for example, be in a gull wing configuration whereby in inboard portion of the wing extends upwardly and outwardly from the fuselage while an outboard portion of the wing then extends substantially horizontally outwardly from the terminal end of the inboard portion.

Port and starboard propulsive rotors may be provided with each generating thrust along the longitudinal axis of the fuselage. According to some embodiments, the port and starboard propulsive rotors may comprise a pusher propeller assembly.

These and other aspects and advantages of the embodiments of the present invention disclosed herein will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiment in conjunction with the drawings of which:

DETAILED DESCRIPTION

Figure 1:
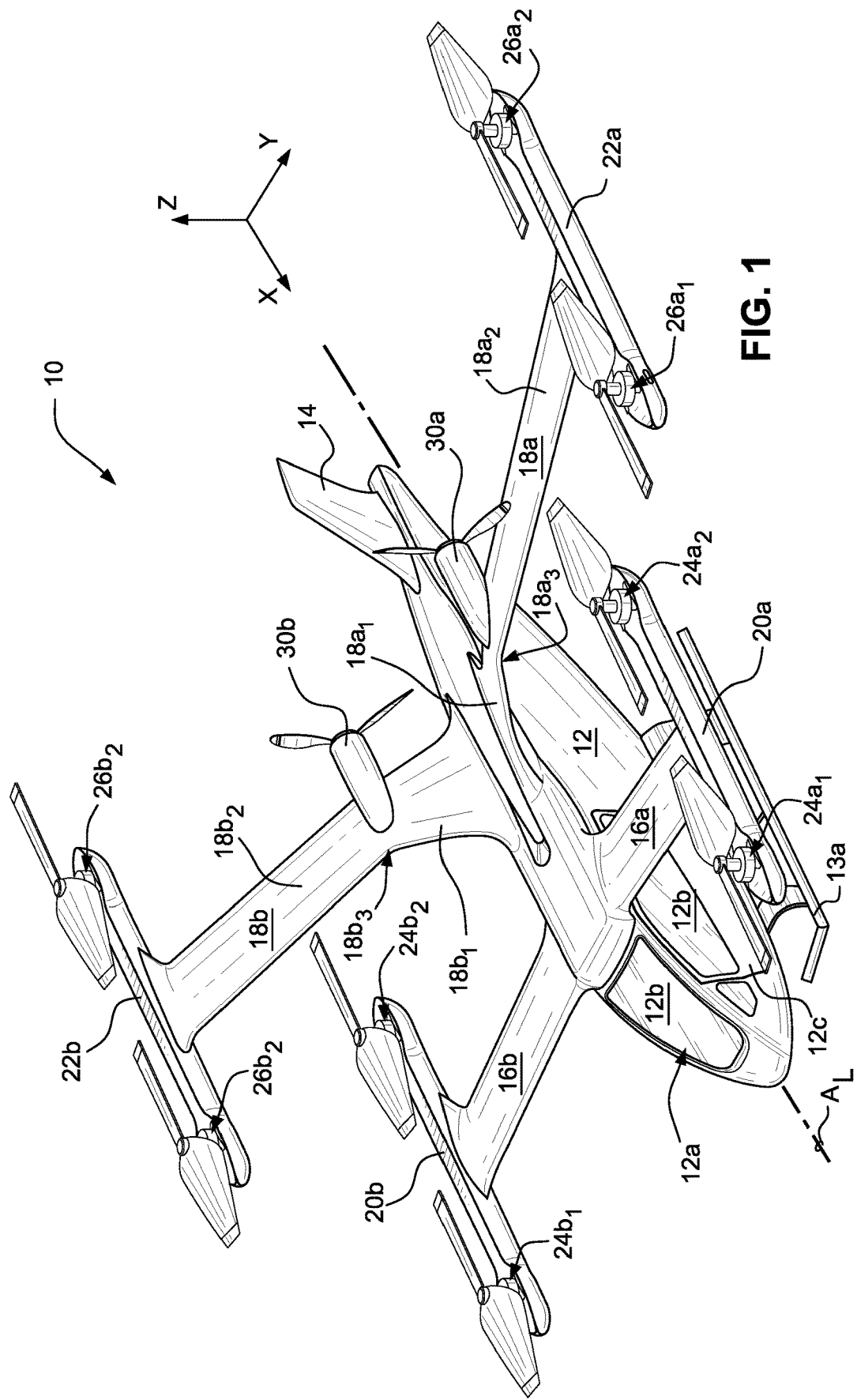
FIG. 1 is a front perspective view of a VTOL aircraft in accordance with an embodiment of this invention.
Figure 2:
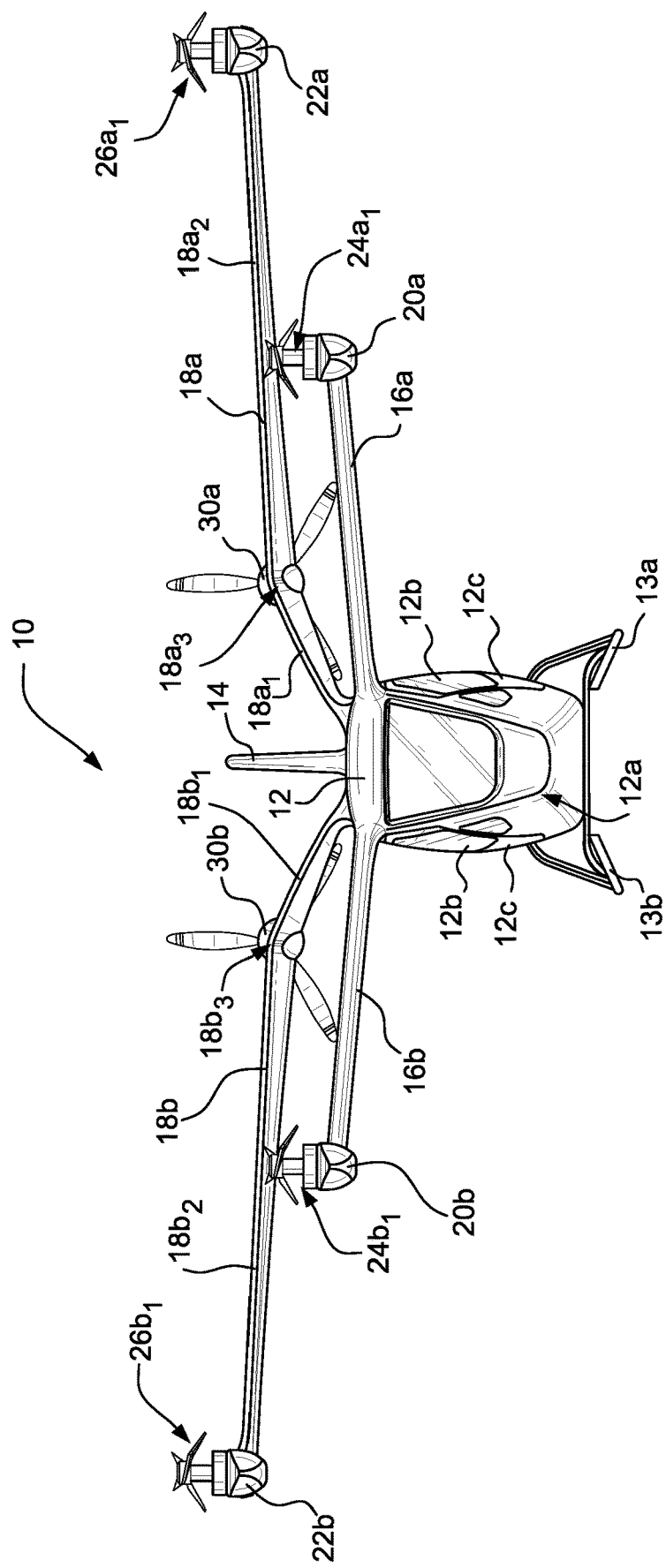
FIGS. 2 and 3 are front and aft elevational views of the VTOL aircraft shown in FIG. 1.
Figure 3:
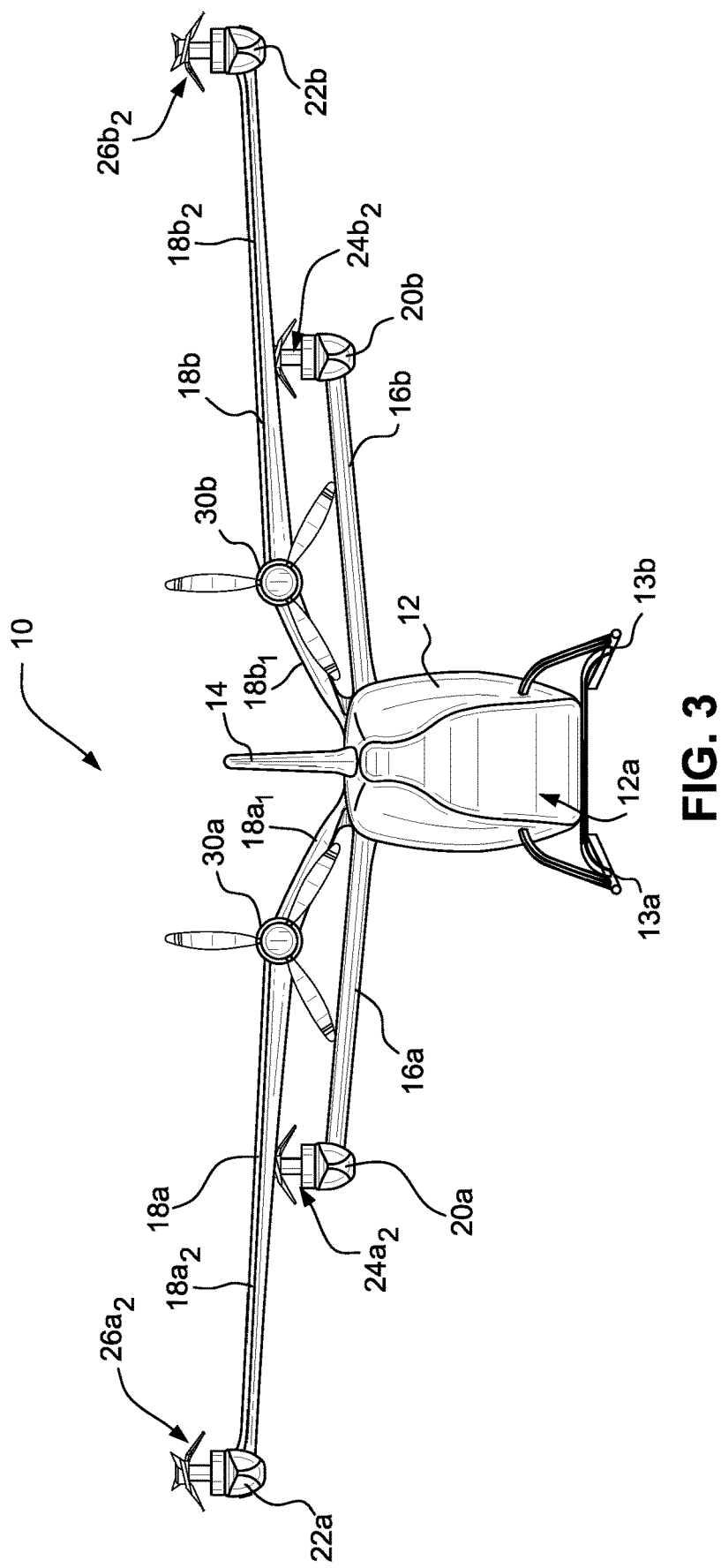
Figure 4:
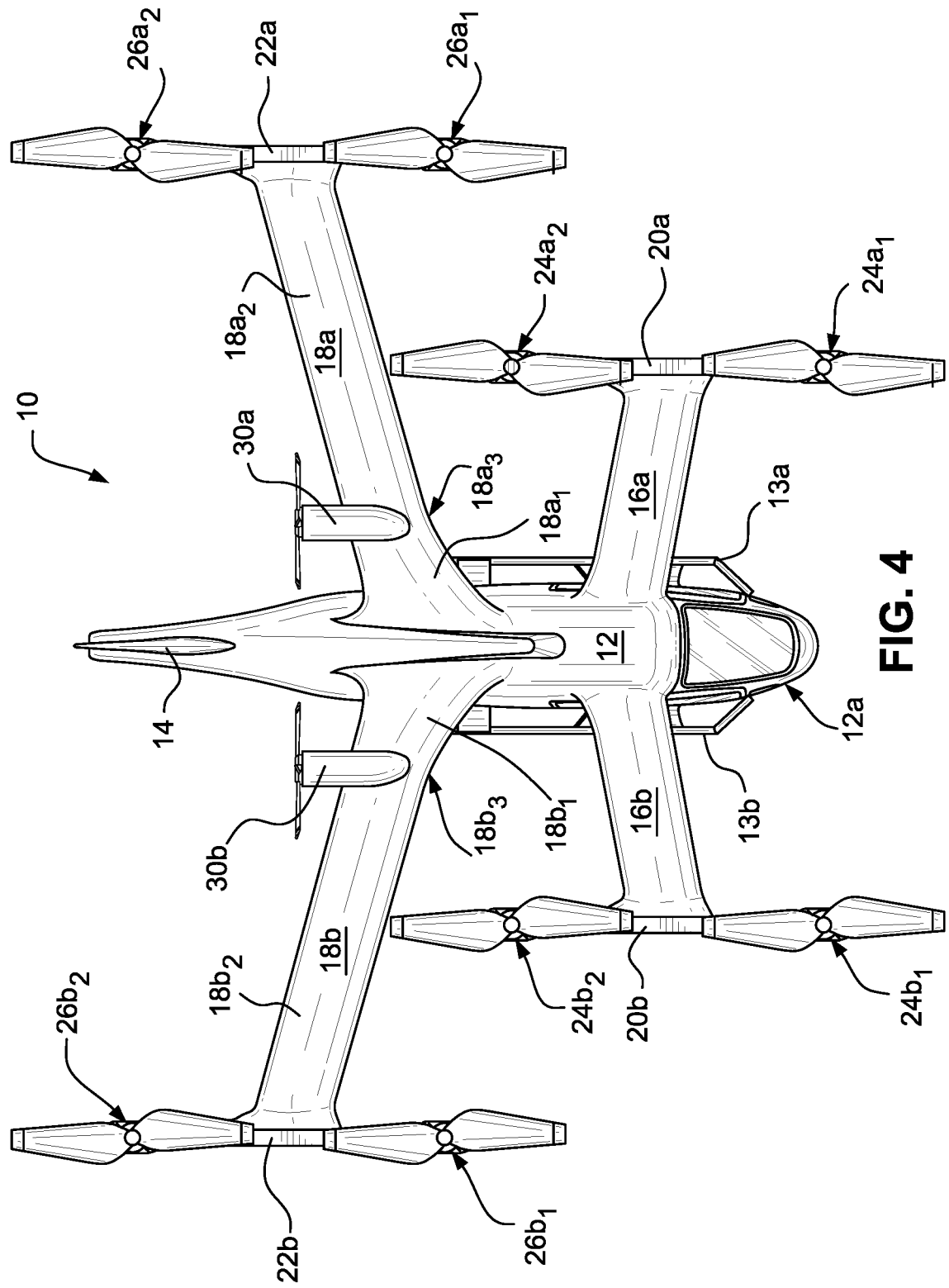
FIGS. 4 and 5 are top and bottom plan views of the VTOL aircraft shown in FIG. 1.
Figure 5:
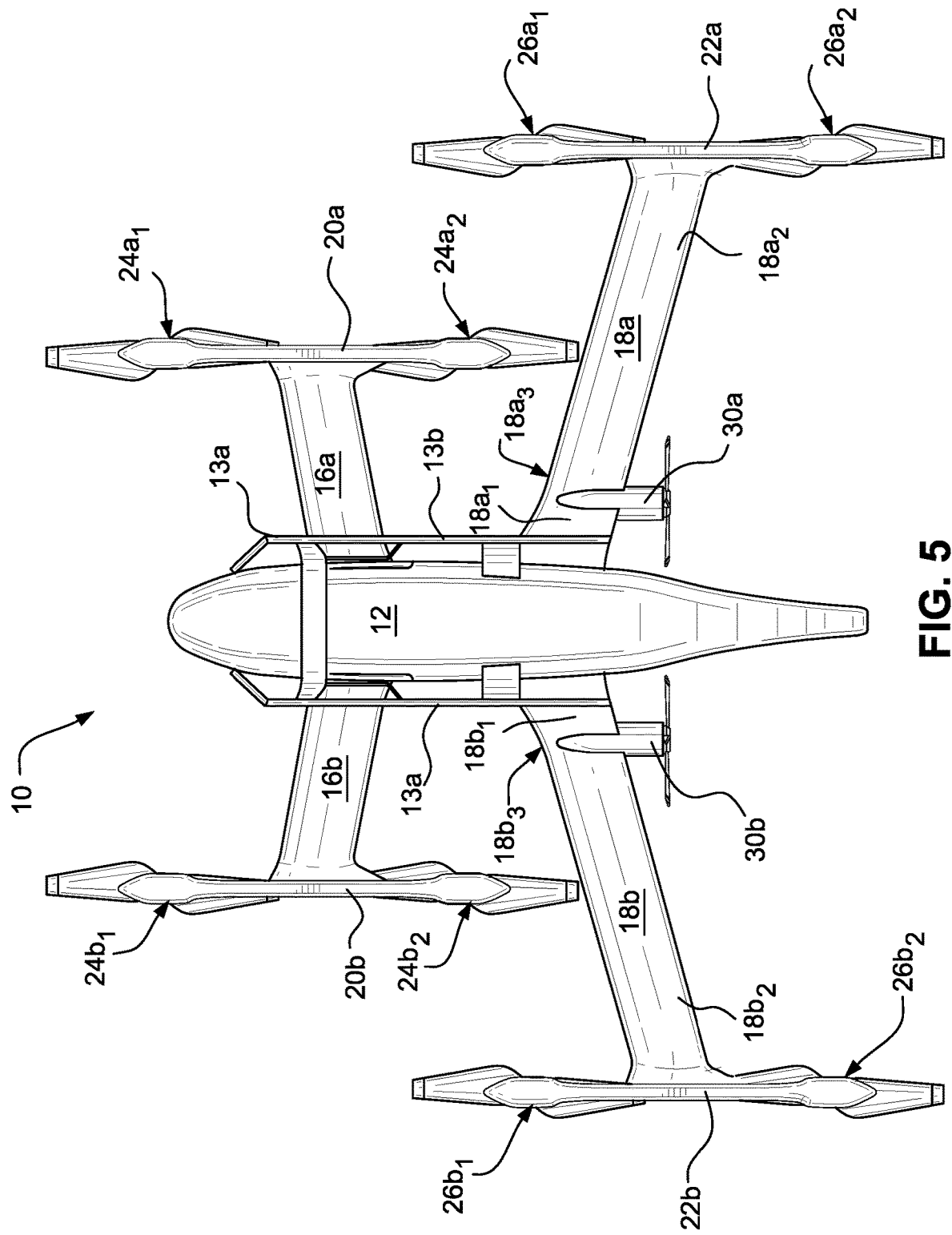
Figure 6:
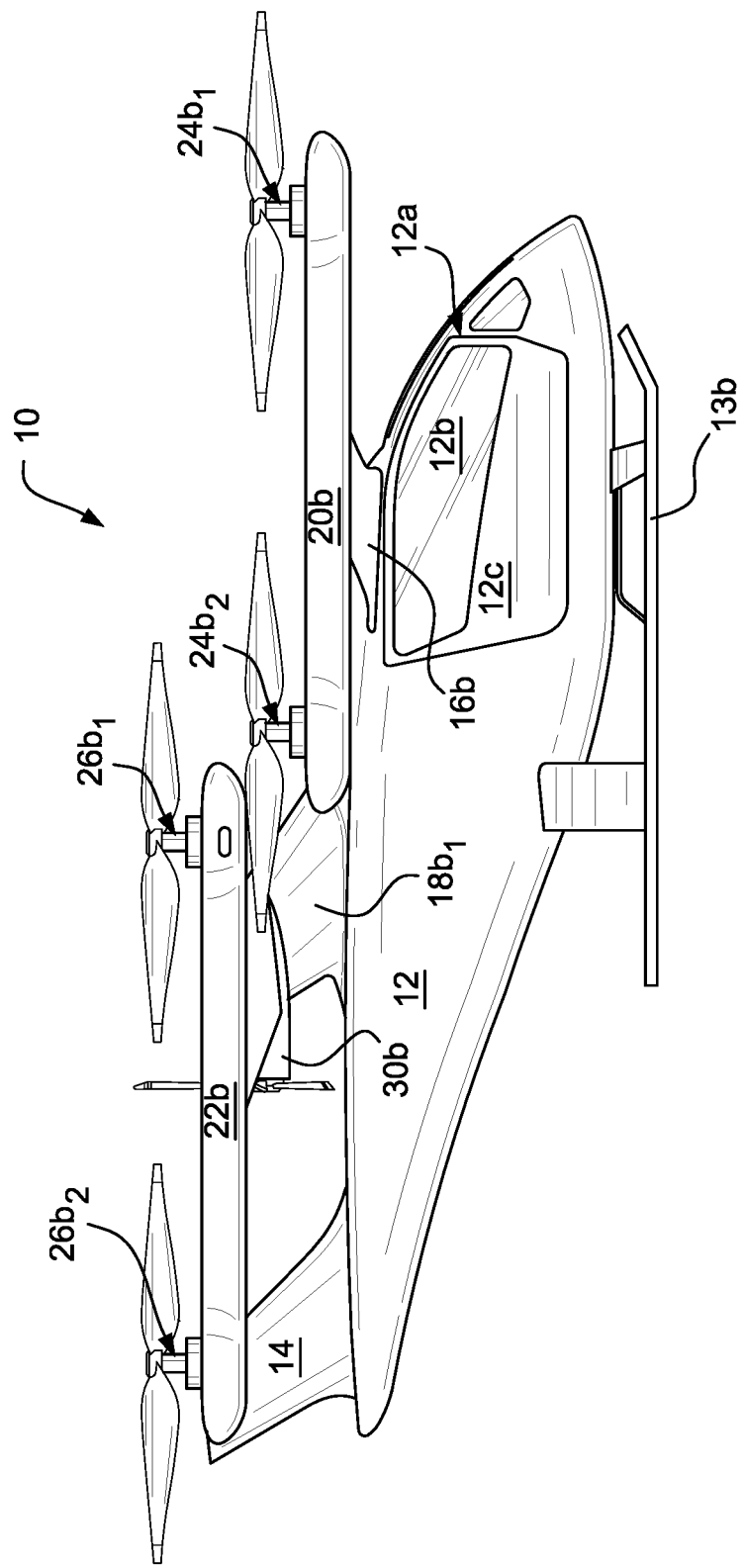
FIGS. 6 and 7 are starboard and port elevational views of the VTOL aircraft shown in FIG. 1.
Figure 7:
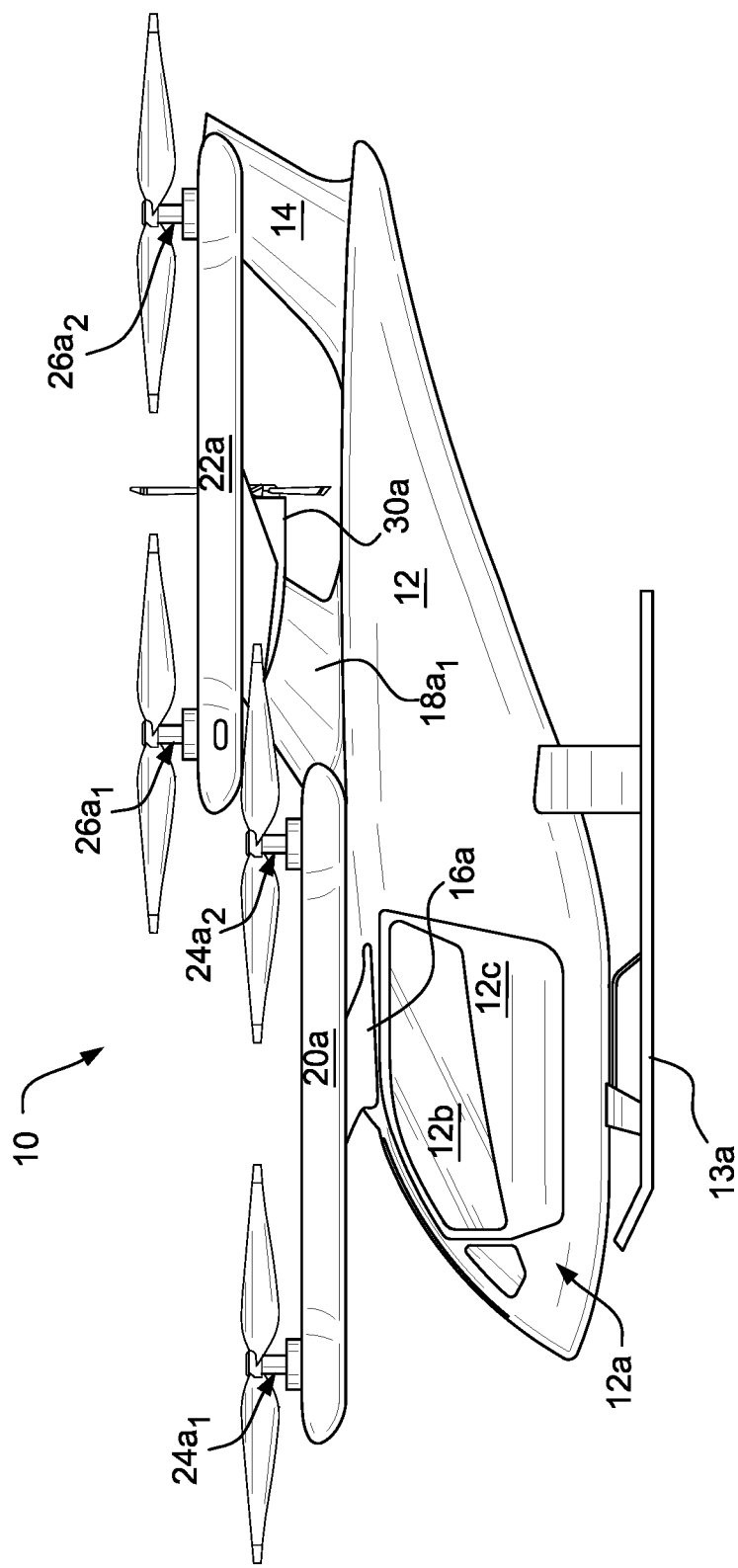

Accompanying FIG. 1 schematically depicts a VTOL aircraft 10 in the form of a multi-rotor vehicle having a fuselage 12 which includes a forward cabin region 12a for pilot and passengers which is provided with transparent windows 12b and a door 12c for ingress/egress from the interior cabin region 12a. A vertical stabilizer 14 located at the aft end of the fuselage 12 may be provided so as to provide directional control about the Z (yaw) axis of the aircraft 10. Control about the X (roll) and Y (pitch) axes may be provided by suitable control surfaces (not shown) associated with the forward pair of port and starboard canards 16a, 16b and the aft pair of port and starboard aerodynamic wings 18a, 18b, respectively. Laterally separated ground skids 13a, 13b extend from the bottom of the fuselage 12 so as to support the aircraft when positioned on the ground surface.

According to the embodiment depicted in FIGS. 1-7, the aircraft 10 will include respective pairs of port and starboard side rotor pods 20a, 20b and 22a, 22b at the terminal end of each of the port and starboard canards 16a, 16b and the port and starboard aerodynamic wings 18a, 18b, respectively (i.e., in a generally T-shaped configuration). Each pair of port and starboard side rotor pods 20a, 20b and 22a, 22b are aligned with the longitudinal axis $A_L$ of the aircraft 10 with the aft rotor pods 22a, 22b being positioned laterally outwardly of the forward rotor pods 20a, 20b relative to the XZ plane of the aircraft fuselage 12 by virtue of the aerodynamic wings 18a, 18b having greater span as compared to the span of the canards 16a, 16b. Each of the side rotor pods 20a, 20b and 22a, 22b will operably contain pairs of forward and aft side rotor assemblies 24a1, 24a2, 24b1, 24b2, 26a1, 26a2, 26b1 and 26b2 aligned with the longitudinal axis $A_L$ of the aircraft 10.

To enhance stability of the aircraft 10 it is preferred that one-half of the side rotor assemblies 24a1, 24a2, 24b1, 24b2, 26a1, 26a2, 26b1 and 26b2 will rotate in one direction about the Z-axis while the other half will rotate in an opposite direction. Since the side rotor assemblies 24a1, 24a2, 24b1, 24b2, 26a1, 26a2, 26b1 and 26b2 generate moments around the X-axis, the counter-rotation of one-half of such side rotor assemblies 24a1, 24a2, 24b1, 24b2, 26a1, 26a2, 26b1 and 26b2 thereby allow the sum of moments about the Y- and X-axes to be zero. Further it is preferred that the forward pairs of rotor assemblies 24a1, 24a2 and 24b1, 24b2 are situated forwardly of the CG of the aircraft 10. Control of the pairs of rotor assemblies 24a1, 24a2, 24b1, 24b2, 26a1, 26a2, 26b1 and 26b2 can be effected by the embodiments disclosed in copending U.S. application Ser. No. 16/564,350 filed on Sep. 9, 2019, the entire contents thereof being expressly incorporated hereinto by reference.

As shown in FIGS. 1-7, aerodynamic pairs of port and starboard canards 16a, 16b and wings 18a, 18b project laterally from the fuselage 12 with the port and starboard canards 16a, 16b being swept in a forward direction relative to the X-axis of the fuselage 12 and the port and starboard aerodynamic wings 18a, 18b being swept in a rearward direction relative to the X-axis of the fuselage 12. The aerodynamic pairs of port and starboard canards 16a, 16b and wings 18a, 18b thereby serve to structurally join the pairs of port and starboard rotor pods 20a, 20b and 22a, 22b to the fuselage 12, respectively. The pairs of port and starboard canards 16a, 16b and wings 18a, 18b, respectively, serve to provide aerodynamic lift during propulsive flight of the aircraft 10 in the direction of the X-axis. In order to achieve propulsive flight of the aircraft 10 in the direction of the X-axis (both forwardly and rearwardly), a pair of port and starboard pusher propeller assemblies 30a, 30b, respectively, are positioned laterally of the longitudinal axis $A_L$ of the fuselage 12 at an aft-facing position on the wings 18a, 18b, respectively. The port and starboard pusher propeller assemblies 30a, 30b are preferably positioned rearwardly of the CG of the aircraft 10.

The port and starboard aft wings 18a, 18b are preferably a "gull wing" configuration such that each includes respective inboard wing sections 18a1, 18b1 extending laterally upwardly and outwardly from the fuselage and outboard wing sections 18a2, 18b2 that are joined to the inboard wing sections 18a1, 18b1 at junction regions 18a3, 18b3 thereof. Each of the outboard wing sections 18a2, 18b2 will therefore preferably extend outwardly from the junction regions 18a3, 18b3 of the inboard wing sections 18a1, 18b1, respectively, so that the outboard wing sections 18a2, 18b2 are positioned in a second generally horizontal plane parallel to the X-Y plane that is displaced above the first generally horizontal plane parallel to the X-Y plane in which the forward wings 16a, 16b are aligned. As noted briefly above, the span of the aft wings 18a, 18b is greater that the span of the forward canards 16a, 16b so as to position the rotor pods 22a, 22b laterally outwardly of the rotor pods 20a, 20b, respectively. Moreover, the port and starboard pusher propeller assemblies 30a, 30b are positioned at the junction regions 18a3, 18b3 of the port and starboard aft wings 18a, 18b, respectively, so as to be inboard of the port and starboard rotor pods 20a, 20b at the terminal ends of the forward canards 16a, 16b, respectively.

The rotor assemblies 24a1, 24a2, 24b1, 24b2, 26a1, 26a2, 26b1 and 26b2 and/or the pusher propeller assemblies 30a, 30b may optionally be ducted.

It will thus be understood that the displacement of the rotor assemblies 24a1, 24a2, 24b1, 24b2, 26a1, 26a2, 26b1 and 26b2 is such that it allows force and moments, even during failure, which is sufficiently enough to sustain the weight of the aircraft 10 with the forces acting on the aircraft center of gravity (CG) with no angular acceleration. In other words, it allows the sum of moments to be zero on the Y and X-axis.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A vertical take-off and landing (VTOL) aircraft comprising:
   a fuselage defining a longitudinal X-axis of the aircraft;
   a forward pair of port and starboard canards extending laterally outwardly from the fuselage substantially in a first XY-plane and being swept in a forward direction relative to the longitudinal X-axis of the aircraft;
   a forward pair of port and starboard rotor pods positioned at respective terminal ends of the forward pair of the port and starboard canards;
   an aft pair of port and starboard aerodynamic gull-configured wings that are swept in an aft direction relative to the longitudinal X-axis of the aircraft;
   an aft pair of port and starboard rotor pods positioned at respective terminal ends of the forward and aft pairs of port and starboard aerodynamic wings, wherein
   the forward pair of port and starboard canards have a span that is less than a span of the aft pair of port and starboard aerodynamic wings such that the aft pair of port and starboard rotor pods positioned at the terminal ends of the aerodynamic wings are positioned laterally outwardly of the forward pair of port and starboard rotor pods positioned at the respective terminal ends of the forward pair of the port and starboard canards, and wherein
   each of the port and starboard rotor pods of the forward and aft pairs thereof are in substantial alignment with the longitudinal X-axis of the fuselage; and wherein
   each of the forward and aft pairs of port and starboard rotor pods comprises a pair of forward and aft rotor assemblies, wherein one-half of the rotor assemblies rotate in one direction about a first rotation axis and a remaining one-half of the rotor assemblies rotate in a second direction about a second rotation axis, wherein each of the first and second rotation axes is parallel to a substantially vertically oriented Z-axis, and wherein
   each of the port and starboard aerodynamic gull-configured wings include an inboard wing section extending laterally upwardly and outwardly from the fuselage and an outboard wing section that is joined to the inboard wing section at a junction region and extends outwardly from the inboard wing section substantially in a second XY-plane that is parallel to and vertically displaced above the first XY-plane; and wherein
   the VTOL aircraft further comprises port and starboard pusher propeller assemblies positioned respectively on the port and starboard aerodynamic gull-configured wings at the junction regions thereof so as to be positioned inboard of the forward pair of the port and starboard rotor pods positioned at the terminal ends of the forward pair of the port and starboard canards.

2. The VTOL aircraft according to claim 1, wherein the fuselage comprises an aft vertical stabilizer.

3. The VTOL aircraft according to claim 1, wherein the forward pairs of port and starboard rotor pods are positioned forwardly of a center of gravity (CG) of the aircraft.

4. The VTOL aircraft according to claim 3, wherein the aft pairs of port and starboard rotor pods are positioned aft of the CG of the aircraft.

5. The VTOL aircraft according to claim 1, wherein the fuselage comprises a pair of ground-engageable skids.

* * * * *